Jan. 23, 1973   R. BOERSMA ET AL   3,712,953
CONDUCTOR ARRANGEMENT FOR METAL CLAD ELECTRIC DISTRIBUTING
AND/OR SWITCHING PLANTS FOR HIGH VOLTAGE
Filed Sept. 3, 1970

INVENTORS
RINTJE BOERSMA
GIJSBERT W. IRIK

United States Patent Office 3,712,953
Patented Jan. 23, 1973

3,712,953
CONDUCTOR ARRANGEMENT FOR METAL CLAD ELECTRIC DISTRIBUTING AND/OR SWITCHING PLANTS FOR HIGH VOLTAGE
Rintje Boersma, Harmelen, and Gijsbert Waldemar Irik, Bilthoven, Netherlands, assignors to N.V. "COQ," Utrecht, Netherlands
Filed Sept. 3, 1970, Ser. No. 69,311
Claims priority, application Netherlands, Jan. 30, 1970, 7001325
Int. Cl. H02g 5/06
U.S. Cl. 174—99 B
11 Claims

ABSTRACT OF THE DISCLOSURE

Bar-like electric conductor surrounded by an earthed metal envelope for metal clad electric distributing and/or switching plants, said bar-like conductor having the shape of a number of bar-shaped elements which are interconnected by thin webs and being supported in said envelope by insulators extending between the enevolepe and a portion of the conductor lying between two bar-shaped elements thereof.

---

Figure 1:
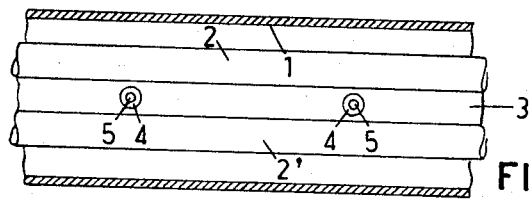

The invention relates to a metal clad electric distributing and/or switching plant for high voltage comprising a closed metal envelope intended to be connected with earth and barlike electric conductors which are insulatedly accommodated therein and kept in place by supporting insulators extending between said envelope and said conductors.

In electric distributing and/or switching plants for very high voltages long bar-like or tubular conductors, such as the conductors of busbar systems and connecting conductors leading to and from busbar systems, switches, cable terminal boxes and other parts of such plants, are held in place centrally in the metal envelope surrounding said conductors concentrically either by means of disc-shaped or double conical bushing insulators or by means of supporting insulators. Such bushing insulators are fixed in the metal envelope either by friction or resilient means in order to prevent said insulators from rapping when a short circuit occurs or clamped between flanges of adjoining parts of the envelope. Not only said bushing insulators but also the means to fix same, the division of the envelope and the flange connections of the parts thereof make the construction of the distributing and switching plant expensive. On the other hand, when cheaper supporting insulators are used, the connection of the conductors to said insulators requires special measures to prevent an unallowable field gradient on the spots of connection.

The invention has the object to solve in a simple and cheap way the problem how to keep relatively long conductors in position in the metal envelope of such a distributing and/or switching plant. This object aimed at is achieved in that said conductors have the shape of a number of parallel bar-shaped elements interconnected by at least one thin web and each supporting insulator extends between the envelope and a portion of such a conductor lying between two bar-shaped elements thereof.

Such conductors may each have the shape of two parallel bar-shaped elements interconnected by a web, whereas each supporting insulator then extends between the envelope and the web. However, the conductors may also each have the shape of a central bar-shaped element and at least three bar-shaped elements arranged in a circular row around, extending parallel to and connected by webs with said central element, whereas each supporting insulator then may extend between the envelope and said central bar-shaped element.

The bar-shaped elements may be hollow. However, they may also have a special cross profile, e.g. a C-shaped cross section.

The constructions referred to and relating to the shape and the support of the conductors have many advantages. For instance, the conductor consisting of bar-shaped elements and webs requires simple fastening means and little machining on the spots of support. The supporting insulators can have a simple form so that they are readily available. In many cases they may consist of cylindrical bars or tubes made of synthetic substance reinforced by fibrous material. Such bars or tubes can be readily fixed both to the conductors and to the metal envelope and they can be cut from bars or tubes which are in stock or available in the market, so that faulty insulators can be quickly replaced by other ones. Since the length of the supporting insulators can be easily adapted to the local deviations of the required dimensions of the envelope, undesired stresses set up in the insulators and on the spots of attachment betweeen the insulators on one hand and the conductors and the envelope on the other hand can be avoided. Conversely, the elasticity of the envelope may be used to produce stresses, that means a compressive or a tensile stress, in the insulators when this is desired in connection with mechanical loads produced thereon during operation. The conductors consisting of bar-shaped elements and one or more webs have a large cooling surface. The connection between such a conductor and a branch conductor can come to lie between bar-shaped elements, e.g. on the web or the central bar-shaped element, so that the fastening means will lie in an almost field free space and will have little influence on the electric field in the relative zone. Finally the distance between the spots of support of the conductors can be readily so chosen as to make the resonance frequency low, e.g. lower than 30 Hz., which considerably decreases the influence of short circuit forces exerted on the conductors, the supporting insulators and the envelope.

Figure 2:
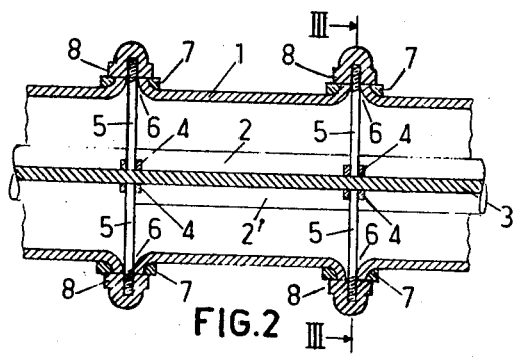
Figure 3:
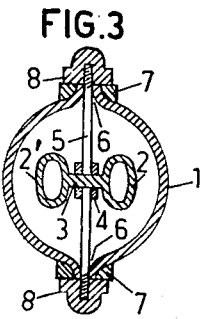
Figure 4:
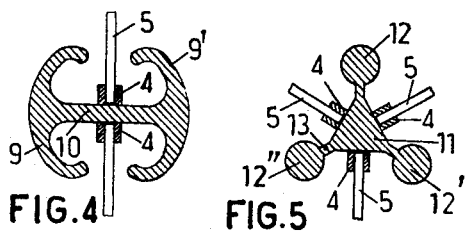
Figure 5:
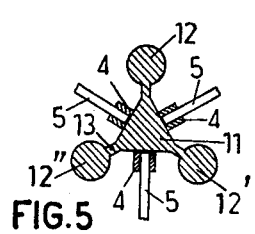
Figure 6:
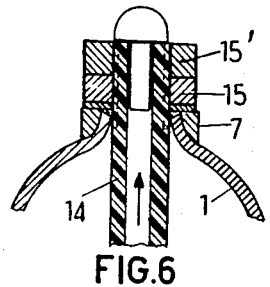
Figure 7:
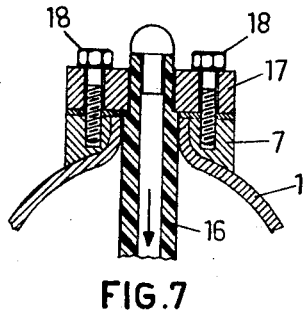
Figure 8:
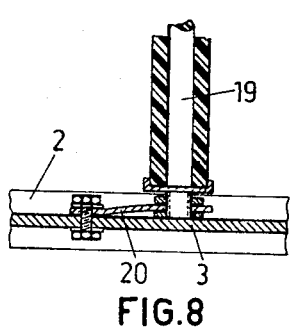

The invention will be further elucidated with the aid of the drawing. Therein are:

FIGS. 1 and 2 axial cross sectional views of a conductor forming part of a metal clad distributing and/or switching plant according to the invention, said conductor being accommodated in a tubular metal envelope and kept in position by supporting insulators, FIG. 3 a cross sectional view taken on the line III—III in FIG. 2, FIG. 4 a cross sectional view of a conductor having another cross profile, FIG. 5 is a cross sectional view of a conductor having still another cross profile, FIG. 6 is a sectional view of the device, by means of which a supporting insulator is fixed to the metal envelope and a tensile stress is set up in said insulator, FIG. 7 is a sectional view of the device, by means of which a supporting insulator is attached to the metal envelope and a compressive stress is set up in said insulator and FIG. 8 is a sectional view of a branch conductor connected with a conductor constructed in accordance with the invention.

In FIGS. 1, 2 and 3 a tubular metal envelope intended to be connected with earth is designated by 1. Mounted centrally in this envelope is a conductor, e.g. a conductor of the bus-bar system of a distributing or switching plant. Said conductor has the shape of two parallel bar-shaped elements 2, 2' and a web 3 interconnecting these bar-shaped elements. Nuts 4 are welded on said web in places lying at given distances from one another and bar-shaped or tubular insulators 5 are screwed in said nuts. These insulators extend through holes 6 of the envelope 1 and rings 7 surrounding these holes and they are fixed in screw-caps 8. It appears from FIG. 3 that the bar-shaped elements 2, 2' are hollow.

In the embodiment shown in FIG. 4 the bar-shaped elements 9, 9' which are interconnerted by a web 10 have a C-shaped cross profile. A thus formed conductor can be more readily made by extrusion than the conductor shown in FIGS. 1, 2, 3.

The conductor illustrated in FIG. 5 consists of three angularly equidistanced parallel bar-shaped elements 12, 12', 12" which are arranged in a circular row around and connected by webs 13 with a central bar-shaped element 11. The nuts 4 for the connection of the insulators 5 are welded on the flanks of the bar-shaped element 11 which in the present case has a triangular cross section.

In all shown embodiments the nuts 4 lie in the space left between two bar-shaped elements 2, 2', or 12, 12', 12", so that they lie in almost field free space and will have little influence on the electric field between the conductor and the envelope.

In FIG. 6 the insulator 14 is provided at its end portion extending through the envelope 1 and the ring 7 with screw thread and fastened by nuts 15, 15'. With the aid of these nuts a tensile stress can be set up in the insulator.

FIG. 7 shows the attachment between the envelope 1 and the insulator 16, in which the end portion of the insulator projecting outwards from the envelope 1 and ring 7 has a smaller diameter and is provided with a pressing ring 17 which is forced on the ring 7 by bolts 18. With the aid of this fastening device a compressive stress can be produced in the insulator.

The insulators 5, 14, 16 may be bars or tubes made of synthetic substance reinforced by fibrous material.

In FIG. 8 a branch conductor 19 is connected to the conductor shown in FIGS. 1, 2, 3 by means of a flexible connecting strip 20. This flexible connecting strip lies together with its fastening means entirely in the almost field free space left between the bar-shaped elements 2, 2' of the main conductor.

What we claim is:

1. A metal clad transmission conductor for electric distribution systems and switching plants for high voltages, comprising:
    an elongate tubular metal envelope having its free state an inner wall surface of given uniform cross section;
    an elongate electrical conductor extending along the axis of said envelope and being insulated therefrom; and
    a plurality of solid supporting insolators extending radially between said conductor and said envelope, said insulators being the sole supports for said conductor and being rigidly fixed both to the conductor and the envelope, the length of said insulators being different from the radial distance between the inner surface of the envelope in its free state and the conductor in the places where the insulators are attached to the conductor and said insulators being positioned in circumferentially spaced relation around said conductor to act in opposition to each other so that the insulators are longitudinally prestressed by the elastic deformation of the envelope.

2. A metal clad transmission conductor as claimed in claim 1, in which each supporting insulator extends through a hole provided in the metal envelope and for each one of said insulators, fastening means are provided which connect the insulator portion protruding from the outer surface of said envelope to said outer surface.

3. A metal clad transmission conductor as claimed in claim 1, in which the elastically deformed envelope exerts tensile stresses on the supporting insulators.

4. A metal clad transmission conductor as claimed in claim 1, in which the elastically deformed envelope exerts compressive stresses on the supporting insulators.

5. A metal clad transmission conductor for electric distribution systems and switching plants for high voltages, comprising in combination:
    an elongate tubular metal envelope having an inner wall surface of essentially uniform cross section;
    an elongate electrical conductor within said envelope, said conductor comprising at least two parallel bar-shaped elements symmetrically arranged in said envelope radially of the axis thereof and spaced inwardly from said inner wall surface so as to be insulated therefrom, and a central portion integrally joining said elements, said central portion being pierced by the axis of said envelope and presenting a plurality of flat surfaces arranged symmetrically about said axis; and
    insulator means for supporting said conductor within said envelope, said insulator means comprising a plurality of sets of essentially cylindrical insulators disposed in spaced relation along said conductor, each set comprising a plurality of insulators equal to the number of said flat surfaces, each associated with one of said flat surfaces and each extending radially of the axis of said envelope so that the axes of the insulators of each set intersect at the axis of said envelope, and attaching means fixing the opposite ends of each insulator respectively to a flat surface of said conductor and to said envelope in longitudinally prestressed condition whereby the conductor is stabilized within the envelope by elastic deformation thereof developing forces which are radial of and symmetrical with respect to said envelope.

6. A metal clad transmission conductor as defined in claim 5 wherein there is a pair of said bar-shaped elements and said central portion is in the form of a relatively thin web connecting said elements and presenting a pair of opposite flat surfaces.

7. A metal clad transmission conductor as defined in claim 6 wherein said elements are of C-shaped cross section.

8. A metal clad transmission conductor as defined in claim 6 wherein said elements are hollow.

9. A metal clad transmission conductor as defined in claim 5 wherein there are three of said bar-shaped elements and said central portion comprises a triangular central section and webs joining the apices of such central section to the respective bar-shaped elements.

10. A metal clad transmission conductor a defined in claim 5 wherein said attaching means comprises threaded connections at the opposite ends of said insulators maintaining them in tension through the elastic properties of said envelope.

11. A metal clad transmisison conductor as defined in claim 5 wherein said attaching means comprises threaded connection at the opposite ends of said insulators maintaining them in compression through the elastic properties of said envelope.

References Cited

UNITED STATES PATENTS

| Re. 23,811 | 3/1954 | Scott, Jr. | 174—99 B |
| 2,205,358 | 6/1940 | Hansell | 174—28 UX |
| 2,251,530 | 8/1941 | Thorne | 174—28 X |
| 2,548,566 | 4/1951 | Stafford | 174—99 B UX |
| 2,875,265 | 2/1959 | Albright | 174—99 B |
| 2,904,621 | 9/1959 | Grier | 174—99 B X |
| 2,964,586 | 12/1960 | Sillman | 174—99 B |
| 3,354,261 | 11/1967 | Polgov | 174—133 B |
| 2,408,408 | 10/1946 | Bock | 174—28 |
| 3,585,270 | 6/1971 | Trump | 174—16 B X |

LARAMIE E. ASKIN, Primary Examiner

U.S. Cl. X.R.

174—16 B, 28, 71 B, 133 B